United States Patent
Chen et al.

(10) Patent No.: US 8,582,090 B2
(45) Date of Patent: Nov. 12, 2013

(54) TESTING HARDENED FIBER OPTIC CONNECTOR HOUSING

(75) Inventors: David Zhi Chen, Richardson, TX (US); George N. Bell, Stormville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 13/274,574

(22) Filed: Oct. 17, 2011

(65) Prior Publication Data

US 2013/0094015 A1    Apr. 18, 2013

(51) Int. Cl.
 *G01N 21/00* (2006.01)
(52) U.S. Cl.
 USPC ........................................................ 356/73.1
(58) Field of Classification Search
 USPC ........................................................ 356/73.1
 See application file for complete search history.

(56) References Cited

U.S. PATENT DOCUMENTS

| | | | | |
|---|---|---|---|---|
| 4,270,383 A | * | 6/1981 | Singer et al. | 73/82 |
| 2012/0073425 A1 | * | 3/2012 | Hashimoto | 84/746 |

OTHER PUBLICATIONS

David Z. Chen; Verizon Nebs Compliance: Hardened Fiber Optic Connectors (HFOC); VZ TPR.9418 Manual; May 2011;pp. 1-46; Issue 6.

David Z. Chen; Verizon Nebs Compliance Hardened Multi-Fiber Optical Connectors (HMFOC);VZ TPR.9432 Manual; Mar. 2011; pp. 1-39; Issue 5.

* cited by examiner

*Primary Examiner* — Tu Nguyen (57) ABSTRACT

A system includes a first assembly including a fiber optic connector. The system also includes a second assembly to which one end of a rigid arm is rotatingly affixed. Another end of the arm is affixed rigidly to a mass. The system further includes a mechanical device for applying a force to the mass. After the mechanical device applies the force to the mass, the mass swings from and about the second assembly and strikes the fiber optic connector.

20 Claims, 10 Drawing Sheets

TESTING HARDENED FIBER OPTIC CONNECTOR HOUSING

BACKGROUND INFORMATION

Optical signals that travel from a central office to customer premises over optical fibers (beyond 20~50 kilometers) will be attenuated due to fiber loss and distorted due to optical dispersion. In some instances, optical signals lose power when the optical signals transition from an optical fiber(s) (e.g., optical fibers in a ribbon) to another optical fiber(s) via a fiber optic connector that aligns and secures the optical fiber ends.

DETAILED DESCRIPTION OF PREFERRED EMBODIMENTS

The following detailed description refers to the accompanying drawings. The same reference numbers in different drawings may identify the same or similar elements. As used herein, the term "impact testing" a device may refer to striking or hitting (e.g., applying an impact) the device to determine the device's resistance to damages. The term "impact testing a fiber optic connector" may include to impact testing a housing of the fiber optic connector.

As described below, a system may impact test a fiber optic connector for resistance against damages. The system may impart an impact to a suspended fiber optic connector via, a hammerhead attached to an arm. When a mechanical device pulls and releases the hammerhead, the hammerhead may strike the fiber optic connector. A control/recording device may record test parameters, such as the momentum/impulse that the hammerhead imparts to the fiber optic connector.

Figure 1:
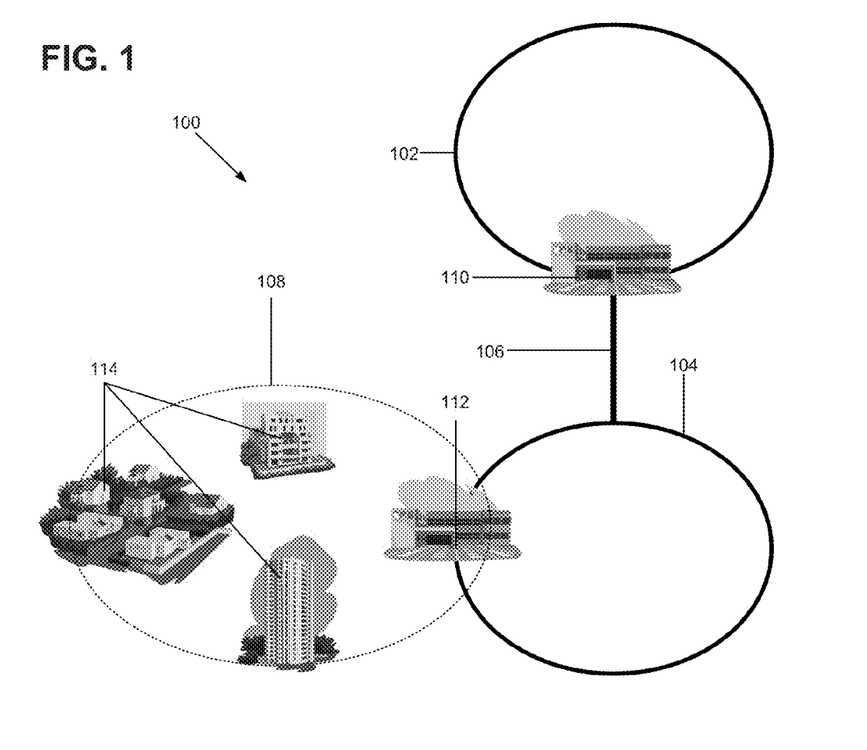
FIG. 1 illustrates an exemplary optical network in which fiber optic connectors may be used.

FIG. 1 shows an exemplary optical network 100 in which fiber optic connectors may be used. As shown, optical network 100 may include metro/regional networks 102 and 104, long haul or ultra-long haul optical lines 106, and edge network 108. Depending on the implementation, optical network 100 may include additional, fewer, or different optical networks and optical lines than those illustrated in FIG. 1. For example, in one implementation, optical network 100 may include additional edge networks and/or metro/regional networks that are interconnected by Synchronous Optical Network (SONET) rings.

Metro/regional network 102 may include optical fibers and central office hubs that are interconnected by the optical fibers. The optical fibers, which may form the backbone of metro/regional network 102, may span approximately 50 to 500 kilometers (km). The central office hubs (also called "central office"), one of which is illustrated as central office hub 110, may include sites that house telecommunication equipment, including switches, optical line terminals, etc. In addition to being connected to other central offices, central office hub 110 may provide telecommunication services to subscribers, such as telephone service, access to the Internet, television service, etc., via optical line terminals.

Metro/regional network 104 may include similar components as metro/regional network 102. Network 104 may operate similarly as network 102. In FIG. 1, metro/regional network 104 is illustrated as including central office hub 112, which may include similar components as central office hub 110. Central office hub 112 may operate similarly as central office hub 110.

Long haul optical lines 106 may include optical fibers that extend from metro/regional optical network 102 to metro/regional network 104. In some implementations, long haul optical lines 106 may span approximately 500~5000 km, with proper in-line optical amplifiers and dense wavelength division multiplexed (DWDM) transponders.

Edge network 108 may include optical networks that provide user access to metro/regional network 104. As shown in FIG. 1, edge network 108 may include access points 114 (e.g., office buildings, residential area, etc.) via which end customers may obtain communication services from central office hub 112.

In network 100, fiber optic connectors may be used in each of networks 102, 104, and 108 to connect different optical fibers and equipment. For example, fiber optic connectors may interconnect long haul optical fiber cables. In another example, fiber optic connectors may connect optical fiber cables from central office hub 112 to optical fiber cables within/near access points 114.

In some implementations, the distance of optical fiber cables that carry signals from central office 102 to access points 114 or customer premises may exceed 10 kilometers. Because pre-factory-made optical fiber cable lengths are set at particular values, fiber optic connectors are needed for the optical fiber cables to cover the distances. To property protect these fiber optic connectors (most of the time these connectors need to be immune to the environment and weathering), the fiber optic connectors are placed within a hardened housing or components that form a hardened housing. To ensure that the housing protects a fiber optic connector, a series of testing on the optical connector housing may be conducted to ensure the quality and performance of optical signal fibers e.g., minimize an optical insertion loss, optical return toss, etc., over, a predicted life time of the fiber optic connector).

For example, prior to installing a hardened fiber optic connector in an outside environment (e.g., in an aerial enclosure), a field engineer may carry the fiber optic connector, which includes a protective housing. Although the field engineer may be careful in handling the fiber optic connectors, from time to time, the field engineer may drop a hardened fiber optic connector. However, its housing may or may not provide sufficient protect on to fiber optic connector components within the housing, against the impact. It may be useful to test hardened fiber optic connectors to estimate/determine their durability and resistance against impact damages.

Figure 2A:
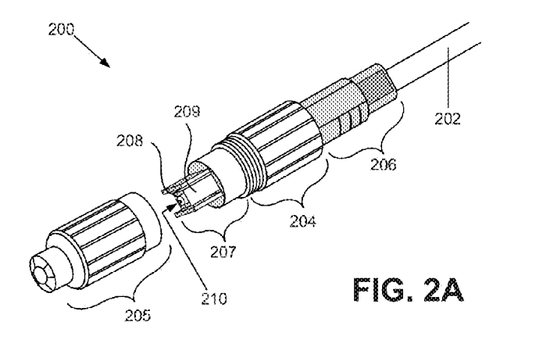
FIGS. 2A and 2B are an isometric perspective view and a side view of an exemplary fiber optic connector.
Figure 2B:
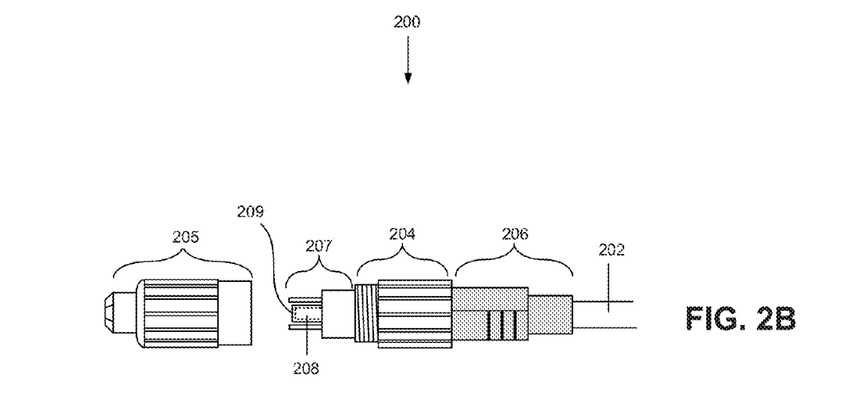

FIGS. 2A and 2B are isometric perspective view and a side view of an exemplary fiber optic connector 200. Although FIGS. 2A and 2B show fiber optic connector 200 as a hardened fiber optic connector, depending on the implementation, fiber optic connector 200 may include other types of connectors (e.g., FC/PC, ST, LC, MT-RJ, HMS-10, DIN, a hardened MT connector, etc.) and/or optical elements (e.g., hardened fiber optic adapter) with appropriate protective coverings. As shown, fiber optic connector 200 may be attached to an optical fiber cable 202. Fiber optic connector 200 may be fitted into another fiber optic connector (e.g., a female connector), to provide for the end of optical fiber 210 inside ferrule 208 to securely join the end of another optical fiber in the other fiber optic connector.

As further shown, fiber optic connector 200 may include a coupling component 204 (e.g., a nut), a connector cap 205, a strain relief boot 206, a sub-assembly housing 207, a ferrule 208, a fiber optic connector sub-assembly 209, and a portion of optical fiber 210 (when fiber optic connector 200 is assembled with optical fiber cable 202). Depending on the implementation, fiber optic connector 200 may include additional, fewer, different, or a different arrangement of components than those illustrated in FIGS. 2A and 2B. For example, fiber optic connector 200 may include a cap for ferrule 208.

Optical fiber cable 202 may include optical fiber 210 for carrying optical signals, material surrounding optical fiber 210 (e.g., Kevla™ fiber) for providing a protective sheath around optical fiber 210, and an outer jacket. Coupling component 204 may connect fiber optic connector 200 to another connector. In addition, coupling component 204 may enclose other components, such as crimp components, etc. to form a protective housing or part of the protective housing. For example, in FIG. 2A, coupling component 204 provides space into which sub-assembly housing 207 may be inserted.

Figure 2C:
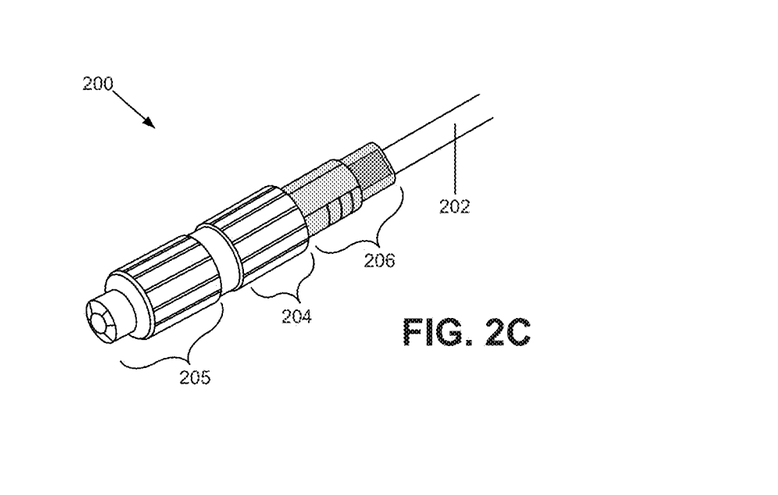
FIGS. 2C and 2D are an isometric perspective view and a side view of the fiber optic connector of FIGS. 2A and 2B when the connector cap is attached to the fiber optic connector.
Figure 2D:
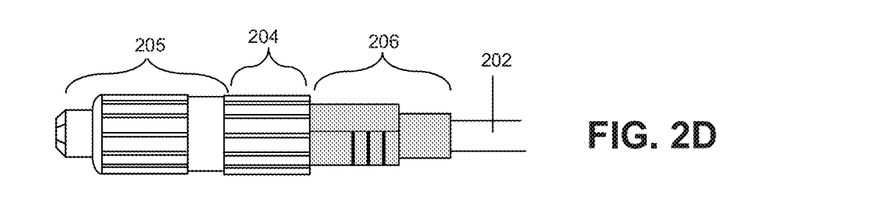

Connector cap 205 may include a protective cover or housing. When fiber optic connector 200 is not in use, connector cap 205 may be placed over fiber optic connector sub-assembly 209 and fitted over a portion of coupling component 204, to form a housing a hardened fiber optic connector housing). This protects components of fiber optic connector 200 should fiber optic connector 200 be dropped, struck, etc. FIGS. 2C and 2D are an isometric perspective view and a side view of the fiber optic connector 200 when connector cap 205 is attached to fiber optic connector 200. During an impact test, connector 205 may be attached to fiber optic connector 200.

Strain relief boot 206 may include material that protects optical fiber cable 202 and prevents optical fiber cable 202 from bending and causing damages to optical fiber(s) in optical fiber cable 202. During the assembly of fiber optic connector 200, strain relief boot 206 may be placed over crimp component(s) (which would be placed over optical fibers 210 running lengthwise from an end of ferrule 208 through coupling component 204 to/through optical fiber cable 202. Sub-assembly housing 207 may provide a housing for ferrule sub-assembly 209.

Ferrule 208 may include a plug that holds an end of optical fiber 210. Ferrule 208 aligns the end of optical fiber 210 to fiber optic connector 200. This allows optical fiber 210 to abut the end of another optical fiber of a complementary connector attaching to fiber optic connector 200. During the assembly of fiber optic connector 200, optical fiber 210 from optical fiber cable 202 may be inserted into ferrule 208 and affixed (e.g., using epoxy) thereto. As shown in FIG. 2A, the end of optical fiber 210 is exposed at the end of ferrule 208. Ferrule sub-assembly 209 may include ferrule 208 and/or other components for supporting ferrule 208 within fiber optic connector 200.

Figure 2E:
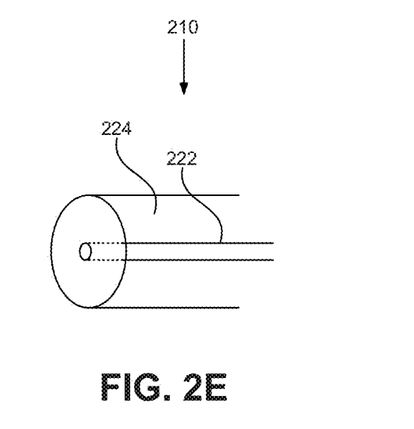
FIGS. 2E and 2F are cross-sectional views of an optical fiber in the fiber optic connector of FIGS. 2A and 2B according to different embodiments.
Figure 2F:
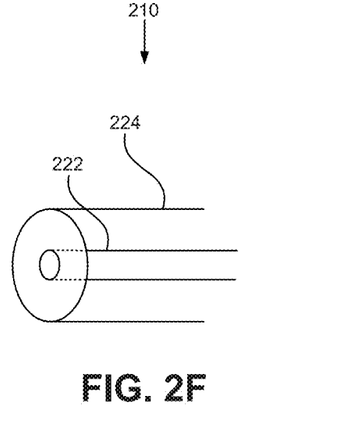

FIGS. 2E and 2F are cross-sectional views of optical fiber 210 according to different embodiments. As shown, optical fiber 210 may include a core 222 and an outer portion 224, referred to as a "cladding 224," that surrounds the core and runs lengthwise inside optical fiber 210. The indices of refraction of core 222 and cladding 224 are selected to facilitate or guide a light beam to travel lengthwise inside optical fiber 210.

As shown, the diameter of the core in FIG. 2E is larger than that of the core in FIG. 2F. Whether an optical fiber can operate as a single mode fiber or a multimode fiber may depend on the diameter of the core. FIG. 2E shows optical fiber 210 implemented as a single mode optical fiber. In one implementation, the diameter of the core diameter may be approximately 8 μm. FIG. 2F shows optical fiber 210 implemented as a multimode optical fiber. In some implementations, the diameter of the core may range approximately from 7 μm to 3 mm (e.g., 50 μm, 60 μm, etc.). In one implementation, the overall diameter of optical fiber 200 in FIGS. 2E and 2F is approximately 125 μm.

Figure 3:
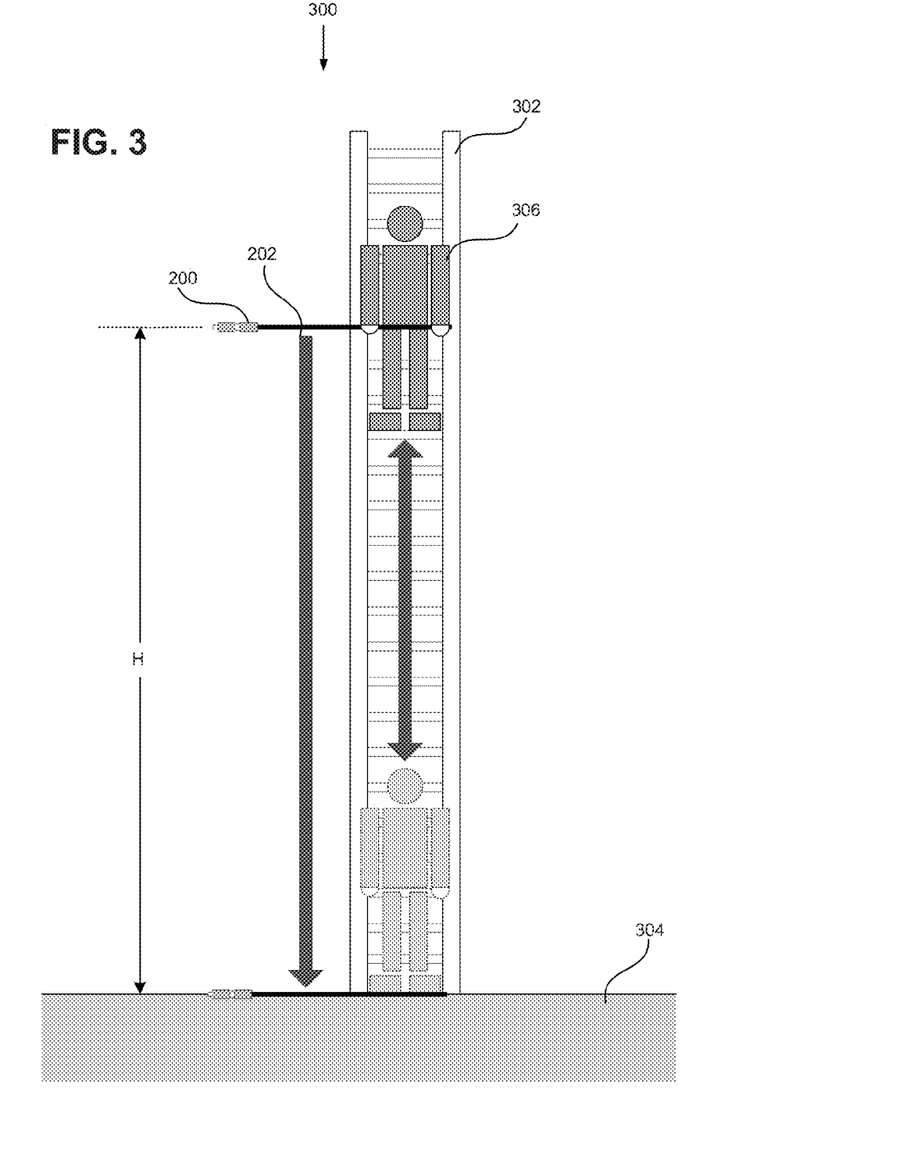
FIG. 3 illustrates an exemplary impact testing of a fiber optic connector.

FIG. 3 illustrates an exemplary impact testing of fiber optic connector 200 for quality control. The test may determine the durability of fiber optic connector 200 attached to optical fiber cable 202 when fiber optic connector 200 and optical fiber cable 202 fall from a typical installation height H (e.g., 15 feet).

As shown, testing environment 300 may include ladder 302 placed on a ground 304. To test fiber optic connector 200 and optical fiber cable 202 attached thereto, a tester 306 (e.g., engineer, operator, etc.) may chill fiber optic connector 200 and optical fiber cable 202, in a freezer, or a refrigerator, to a temperature ranging from −20 to −40 degrees centigrade. Chilling fiber optic connector 200 and optical fiber cable 202 may increase the brittleness of components/elements within fiber optic connector 200 and optical fiber cable 202 and may provide for appropriate conditions for the impact test. In addition, as discussed above, coupling component 204 may be fitted with connector cap 205, to form the housing.

Once fiber optic connector 200 and optical fiber cable 202 are chilled to an appropriate temperature, tester 306 conveys fiber optic connector 200 and optical fiber cable 202 on ladder 302 to about H feet (e.g., 15 feet) above ground 304 and drops fiber optic connector 200 and optical fiber cable 202 to ground 304. After fiber optic connector 200 and optical fiber cable 202 hit ground 304, tester 306 examines fiber optic connector 200 and optical fiber cable 202 for damages (e.g., breaks, detachments, scratches, etc.). To obtain a statistical significance, tester 306 may repeat the trial/experiment about 10-20 times (e.g., 15 times) over a set of fiber optic connectors 200/optical fiber cables 202. In some impact tests, tester 306 may repeat the experiment for each of fiber optic connectors 200 and optical fiber cables 202.

In the impact testing illustrated in FIG. 3, a number of factors may affect the results of the testing. One factor may be that a number of trials affects the statistical significance of a testing result. For example, too few trials (e.g., 15-20 trials) may be insufficient to provide for a statistical significance.

Another factor may be that fiber optic connector 200 and optical fiber cable 202 can warm quickly. To avoid fiber optic connector 200 and optical fiber cable 202 thawing to a significant extent, tester 306 may need to move fast, in conveying fiber optic connector 200 and optical fiber cable 202 from a refrigerator/freezer to H feet above ground 304. This may be difficult if there is only one tester 306 and/or if tester 306 is required to perform the experiment for hundreds/thousands of fiber optic connectors 200 and optical fiber cables 202.

Figures 4A, 4B, 4C:
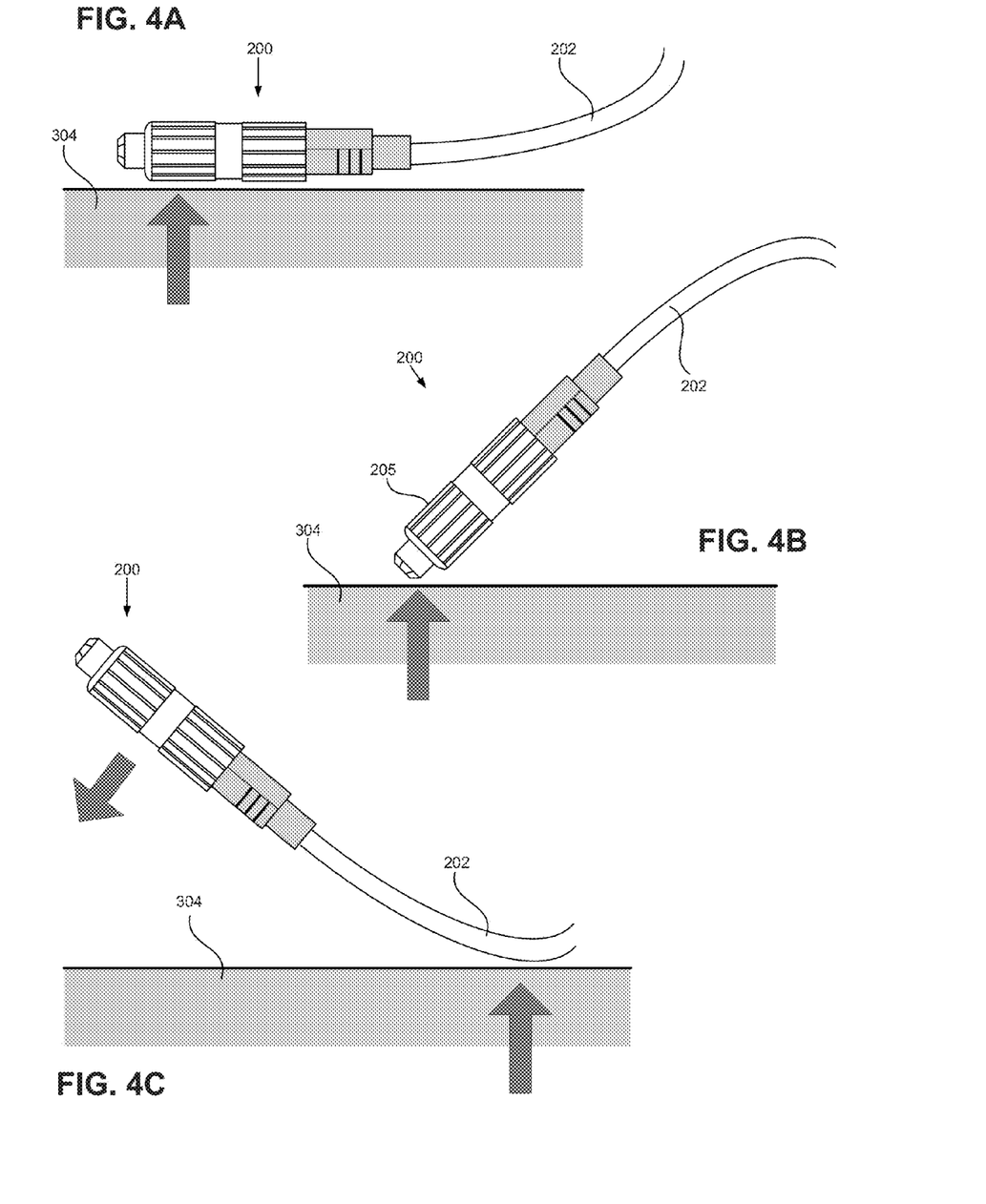
FIGS. 4A through 4C illustrate different orientations in which the fiber optic connector of FIGS. 2A and 2B may hit the ground during the impact testing of FIG. 3.

Yet another factor may be that different trials may result in fiber optic connector 200 hitting ground 304 at different points on fiber optic connector 200. FIGS. 4A through 4C illustrate different orientations in which fiber optic connector 200 and optical fiber cable 202 may hit ground 304 during the impact testing of FIG. 3.

FIG. 4A illustrates fiber optic connector 200 hitting ground 304 on a side surface of fiber optic connector 200, with optical fiber cable 202 in a convex configuration with respect to ground 304. FIG. 4B illustrates fiber optic connector 200 hitting ground 304, with optical fiber cable 202 in a concave configuration with respect to ground 304. FIG. 4C illustrates optical fiber cable 202 hitting ground 304 before fiber optic connector 200.

Although not shown, fiber optic connector 200 and optical fiber cable 202 may hit ground 304 in other ways. Furthermore, depending on the shape of optical fiber cable 202 (e.g., concave, convex, s-shaped, straight, etc. and its motion (e.g., rotating, spinning, etc.) during its descent from H feet above ground 304, fiber optic connector 200 may receive more or less impact on different locations on the body/housing of fiber optic connector 200. In some instances, fiber optic connector 200 may receive multiple blows. Because of different ways in which fiber optic connector 200 can hit ground 304, results of an impact test may not accurately reflect structural strengths and weaknesses of fiber optic connector 200.

Figure 5:
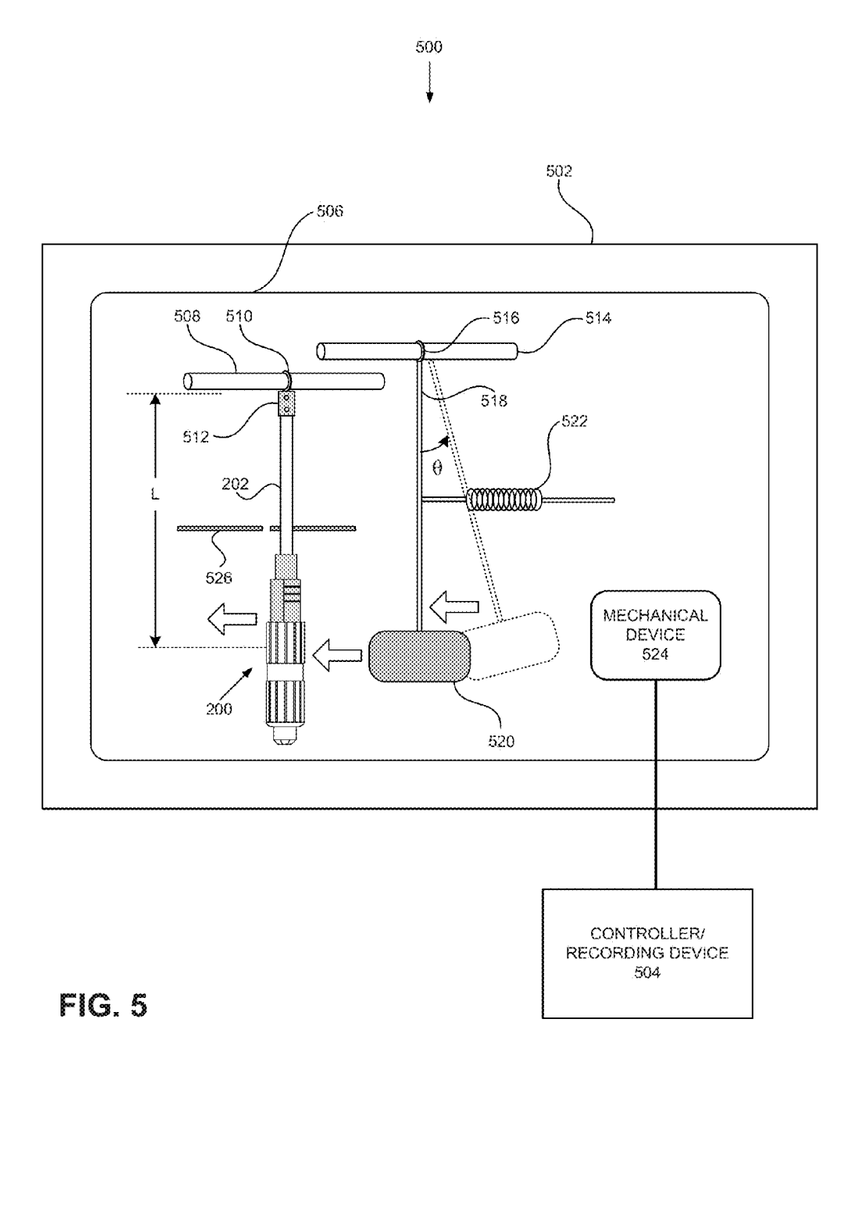
FIG. 5 is a diagram of an exemplary system for automating/emulating the impact testing of FIG. 3.

FIG. 5 is a diagram of an exemplary system 500 for automating/emulating the impact testing of FIG. 3. As shown, system 500 may include a cooling device 502, controller/recording device 504, frame 506, cable support component 508, rotator 510, cable holder 512, hammer support component 514, rotator 516, arm 518, hammerhead 520, force translator 522, mechanical device 524, cable catcher 526, fiber optic connector 200 and optical fiber cable 202. Depending on the implementation, system 500 may include additional, fewer, different, or a different arrangement of components/devices than those illustrated in FIG. 5. For example, in one implementation, system 500 may not include force translator 522. In another example, in place of fiber optic connector 200, system 500 may include another type of optical component/device that is to be impact tested, such as a fiber optic connector housing, hardened fiber optic adapters, other optical components that are designed to be used in outside plant environments (e.g., hardened optical amplifier, regenerators, etc.), etc.

Cooling device 502 may cool fiber optic connector 200 and optical fiber cable 202 to a desired temperature, by lowering the ambient temperature. In some implementations, controller/recording device 504 may control cooling device 502 to automatically set fiber optic connector 200 and optical fiber cable 202 at different temperatures. At each temperature, controller/recording device 504 may run a predetermined number of impact test trials.

Controller/recording device 504 may control cooling device 502 and/or mechanical device 524. In controlling cooling device 502, controller/recording device 504 may drive cooling device 502 to set the ambient temperature of components/devices within cooling device 502. In controlling mechanical device 524, controller/recording device 504 may cause mechanical device 524 to apply an appropriate amount of force to arm 518-hammerhead 520 assembly, to strike fiber optic connector 200.

In some implementations, controller/recording device 504 may drive each impact test trial and record relevant trial parameters. For example, controller/recording device 504 may cause mechanical device 524 to drive hammerhead 520 to hit fiber optic connector 200. In addition, controller/recording device 504 may create a record for each trial of an impact test run. The record may include the time of the trial, the trial number, the amount of force/impulse that mechanical device 524 applied to force translator 522, etc. After/during the impact test, tester 306 may add or modify trial/test related information, such as, for example, the type of damage detected fiber optic connector 200, the number of optical fiber breaks, identities of a specific subcomponent that is damaged, etc., via a graphical user interface (GUI) provided by controller/recording device 504.

Frame 506 may provide stable structures for affixing or mounting other components of system 500. For example, cable support component 508, hammer support component 514, mechanical device 524, and cable catcher 526 may be affixed to or attached to frame 506. Although frame 506 is shown as a panel in FIG. 5, frame 506 may include beams, additional panels, supports, etc.

Cable support component 508 and rotator 510 may form an assembly in which rotator 510 is rotatingly attached to cable support component 508. Cable support component 508 may be affixed to frame 506, such that cable support component 508 may rigidly bear a force applied by rotator 510. Rotator 510 may rotate about cable support component 508, in a direction parallel to the direction in which hammerhead 518 may move to strike fiber optic connector 2 during an impact test.

Cable holder 512 may hold optical fiber cable 202. Cable holder 512 may be implemented so that tester 306 may easily secure or loosen optical fiber cable 202 to/from cable holder 512. In some implementations, cable holder 512 may be affixed to rotator 510, such that cable holder 512 rotates with rotator 510. In other implementations, system 500 may not include rotator 510, and cable holder 512 may be directly affixed to cable support component 508.

Hammer support component 514 and rotator 516 may form an assembly in which rotator 516 is rotatingly attached to hammer support component 514. Hammer support component 514 may be held or supported by frame 506, such that hammer support component 514 can bear a force applied by rotator 516 (e.g., the weight of hammerhead 520 pulling on rotator 516 via arm 518). Rotator 516 may rotate about hammer support component 514 with relatively little friction in a direction parallel to the direction in which hammerhead 520 may move to strike fiber optic connector 200.

Arm 518 may connect hammerhead 520 to rotator 516. The ends of arm 518 may be rigidly attached to rotator 516 and hammerhead 520 such that rotator 516, arm 518, and hammerhead 520 may swing together about hammer support component 514. In some implementations, system 500 may not include rotator 516, and one end of arm 518 may be rigidly affixed to hammer support component 514. In these implementations, frame 506 may hold hammer support component 514 such that hammer support component 514 and arm 518 may swing together.

Hammerhead 520 includes an object (e.g., a head of a pendulum) or a mass for striking fiber optic connector 200. Hammerhead 520 may be rigidly affixed to the other end of arm 518. Depending on the impact test, tester 306 may replace hammerhead 520 with another hammerhead of specific shape (e.g., a shape designed to impact fiber optic connector 200 over a small area), size, mass, and material (e.g., steel, plastic, rubber, etc.).

Force translator 522 may include, for example, a spring, an elastic band, or a spring-like or resilient component. One end of force translator 522 may be attached to arm 518 or hammerhead 520, and the other end of force translator 522 may be attached to frame 506. Force translator 522 may push arm 518 or hammerhead 520 in an arc about hammerhead support component 514. Force translator 522 (e.g., spring) may be adjusted to modify the force with which hammerhead 520 may strike fiber optic connector 200.

Mechanical device 524 may include an electromechanical component (e.g., a motor, servo device, etc.) that may be controlled by controller/recording device 504. Depending on the control signal from controller/recording device 504, mechanical device 524 may apply a specific amount of force to either arm 518 or hammerhead 520 (e.g., pull hammerhead 520 until arm 518 forms angle θ relative to a vertical axis and let go of hammerhead 520). Consequently, hammerhead 520 may strike fiber optic connector 200 with the specified momentum. In some implementations, mechanical device 524 may be manually manipulated to apply a specified amount of force to arm 518 or hammerhead 520.

Cable catcher 526 may catch optical fiber cable 202 when optical fiber cable 202 swings back after hammerhead 520 strikes fiber optic connector 200. Cable catcher 526 may include, for example, an enclosure with a spring-loaded gate that opens when optical fiber cable 202 pushes cable catcher 526 and closes when optical fiber 202 enters the enclosure. and By catching optical fiber cable 202, cable catcher 526 may prevent fiber optic connector 200 from swinging back toward hammerhead 520 and hitting hammerhead 520.

In system 500, controller/recording device 504 may control the velocity of hammerhead 520 to impart a specific amount of impulse/momentum to fiber optic connector 200 at the point of impact. In one implementation, control/recording device 504 may adjust tension on force translator 522 (e.g., spring) via mechanical device 524 or pull back and release hammerhead 520 at an appropriate distance from a vertical axis via mechanical device 524.

In one implementation, to determine the appropriate tension in spring 522 or the distance by which hammerhead 520 should be pulled back, controller/recording device 504 may consult numerically obtained solutions to equations of motion for hammerhead 520.

Assuming for the moment that system 500 does not include force translator 522, the equation of motion for hammerhead 520 is the equation of motion for a pendulum:

$$L d^2\theta/dt^2 = g \sin\theta \quad (1)$$

In expression (1), L is the length of arm 518. The solution to (1) (e.g., a numerical solution) may be stored controller/recording device 504, for example, as a set of numbers in an array, a table, records, etc.

Assume that force translator 522 is a spring that obeys Hooke's law; that one end of the spring is attached to a fixed point far away from arm 518; and that the other end of the spring is attached to a point on arm 518. Accordingly, expression (1) can be modified to approximately account for force translator 522. The modified expression is the equation of motion of a pendulum with a spring attached to the arm of the pendulum:

$$d^2\theta/dt^2 = (g/L)\sin\theta - (S/L)(k/m)\sin 2\theta \quad (2)$$

In expression (2), S is the distance from rotator 516 (or the point about which arm 518 may rotate) to the point (on arm 518) at which one end of spring 522 is attached. Numerical solutions to expression (2) may be stored in controller/recording device 504.

The speed and the momentum of hammerhead 520 at the point of impact for system 500 with and without force translator 522 can be determined from the solutions to equations (1) and (2), respectively. Similarly, controller/recording device 504 may determine the amount of tension to provide to force translator 522 or an appropriate amount of distance by which hammerhead 520 should be pulled back (before its release) based on the numerical solutions and the desired level of impact on fiber optic connector 200.

In some implementations, rather than relying on numerical solutions to the equations (1) and (2), system 500 may include a velocity sensor that is placed at or near rotator 516. The sensor may measure the actual angular velocity of arm 518. Controller/recording device 504 may determine the speed of hammerhead 520 and its momentum at the point of impact based on the angular velocity of arm 518. Furthermore, based on the measured angular velocity, controller/recording device 504 may cause mechanical device 524 to apply more or less force on hammerhead 520, as hammerhead 520 moves to strike fiber optic connector 200. In such implementations, controller/recording device 504 and the velocity sensor may operate as a servo controller for mechanical device 524.

In some implementations, system 500 may include a temperature sensor that measures changes in the temperature of fiber optic connector 200. The temperature sensor may be directly coupled to fiber optic connector 200, or alternatively, may sense infrared waves from fiber optic connector 200. The temperature sensor may output measured temperatures to controller/recording device 504.

In these implementations, based on temperatures of fiber optic connector 200 before and after an impact from hammerhead 520 (i.e., based on changes in the temperature of fiber optic connector 200), controller/recording device 504 may determine the amount of kinetic energy that is imparted by hammerhead 520, absorbed by fiber optic connector 200, and converted into the internal energy (e.g., heat) of fiber optic connector 200. The determined energy may be used to select the type of hammerhead 520, change parameters of system 500 (e.g., lengthen or shorten arm 518), redesign fiber optic connector 200 (e.g., change materials from which components 204, 206, 206, 207, 208, 209, and/or etc., are constructed). For example, fiber optic connector 200 may be redesigned to change the rigidity of the housing formed by coupling component 204 and connector cap 205, the deformability of the housing, etc.

Figure 6:
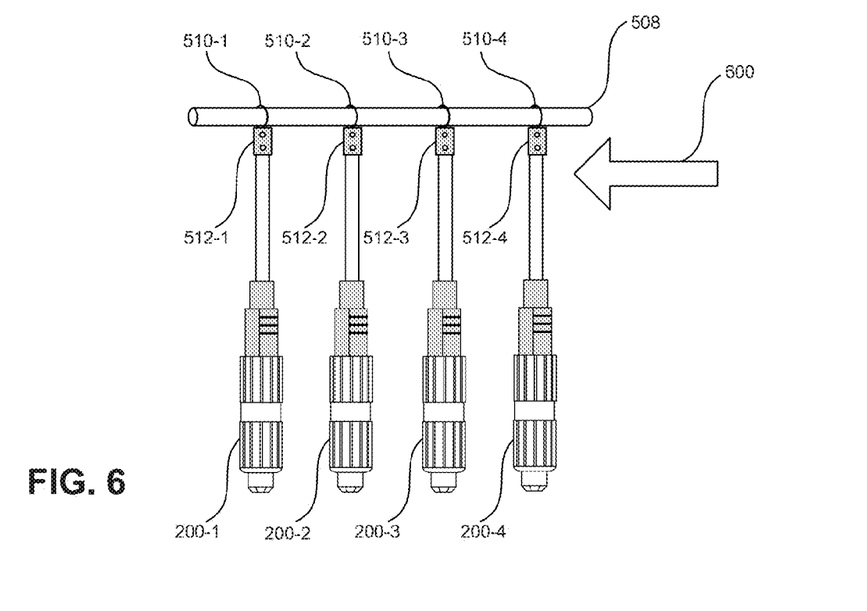
FIG. 6 illustrates a portion of the system of FIG. 5 according to another implementation.

FIG. 6 illustrates a portion of system 500 according to another implementation. As shown, in this implementation, cable support component 508 may support rotators 510-1 through 510-4. As further shown, rotators 510-1, 510-2, 510-3, and 510-4 are attached to corresponding cable holders 512-1, 512-2, 512-3, and 512-4, respectively. Cable holders 512-1, 512-2, 512-3, and 512-4 may retain cables attached to fiber optic connectors 200-1, 200-2, 200-3, and 200-4, respectively. Although FIG. 6 shows system 500 components for retaining up to four fiber optic connectors 200-1 through 200-4, in other implementations, system 500 may include components to retain additional or fewer fiber optic connectors than those illustrated in FIG. 6.

In system 500, in accordance with FIG. 6, controller/recording device 504 may control components/devices in system 500 to automatically impact test each of fiber optic connectors 200-1 through 200-4. To test fiber optic connector 200-1, controller/recording device 504 may cause mechanical device 524 to apply a force to hammerhead 520, directly or indirectly (e.g., by pulling and releasing hammerhead 520, by applying an impact to hammerhead 520, or by applying a force to force translator 522). After hammerhead 520 strikes fiber optic connector 200-1, controller/recording device 504 may cause cable support component 508 (or fiber optic connectors 512) to slide in a particular direction (e.g., in the direction of arrow 600). When the next fiber optic connector 200-2 is in the position for testing, controller/recording device 504 may cause hammerhead 520 to strike fiber optic connector 200-2. Controller/recording device 504 may similarly test fiber optic connectors 200-3 and 200-4. While, during, or after the testing of each of fiber optic connectors 200-1 through 200-4, controller/recording device 504 may record parameters that are associated with each of the test trials. After the impact test has been performed for all of fiber optic connectors 200-1 through 200-4, tester 306 may replace fiber optic connectors 200-1 through 200-4 in system 500 with different fiber optic connectors for another round of impact test.

Using system 500 may provide repeatability of performing impact tests with respect to a specific feature (e.g., geometry of system 500) and may allow tester 306 to control different parameters over impact tests. For example, system 500 permits fiber optic connector 200 to be positioned/oriented in a specific location so as to be struck by hammerhead 520. Accordingly, over multiple impact test trials, hammerhead 520 may strike the same location on different fiber optic connectors 200. In this way, system 500 provides for repeatability.

In another example, in system 500, tester 306 may change the speed of hammerhead 520 (e.g., via controller/recording device 504), to emulate dropping fiber optic connector 200 from a particular height (e.g., by adjusting the tension on force translator 522 (e.g., spring), by pulling hammerhead 520 back to different distances, etc.).

In general, in system 500, tester 306 may use different types of components to test different impact conditions (e.g., different hammerheads 520 whose surfaces may approximate different ground surfaces/conditions e.g., plastic hammerhead, rubber hammerhead, steel hammerhead, soft hammerhead, hard hammerhead, etc.), hammerheads of different masses and shape to approximate fiber optic connector 200 hitting different objects, springs with different spring constants, etc.).

Figure 7:
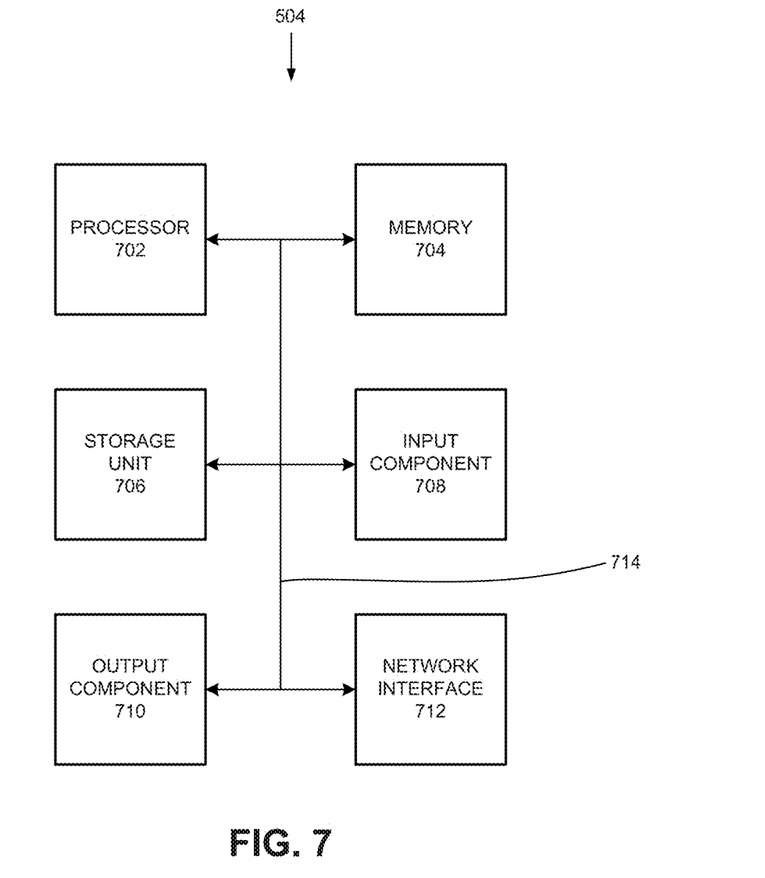
FIG. 7 is a block diagram of exemplary components of the system of FIG. 5.

FIG. 7 is a block diagram of exemplary components of controller/recording device 504. As shown, device 504 may include a processor 702, memory 704, storage unit 706, input component 708, output component 710, network interface 712, and communication path 714. In different implementations, device 504 may include additional, fewer, different, or different arrangement of components than the ones illustrated in FIG. 7. For example, device 504 may include line cards for connecting to external buses.

Processor 702 may include a processor, a microprocessor, an Application Specific Integrated Circuit (ASIC), a Field Programmable Gate Array (FPGA), and/or other processing logic (e.g., embedded devices) capable of controlling device 504.

Memory 704 may include static memory, such as read only memory (ROM), and/or dynamic memory, such as random access memory (RAM), or onboard cache, for storing data and machine-readable instructions (e.g., programs, scripts, etc.). Storage unit 706 may include a floppy disk, CD ROM, CD read/write (R/W) disc, and/or flash memory, as well as other types of storage devices (e.g., hard disk drive) for storing data and/or machine-readable instructions (e.g., a program, script, etc.). As used herein, the term "computer-readable medium" may include memory 704 and/or storage unit 706. Processor 702 may execute computer-readable instructions on a computer-readable medium, to perform different processes and serve functions that are associated with or described herein with respect to controller/recording device 504.

Input component 708 and output component 710 may provide input and output from/to a user to/front device 504. Input/output components 708 and 710 may include a display screen, a keyboard, a mouse, a speaker, a microphone, a camera, a DVD reader, Universal Serial Bus (USB) lines, high definition media interface (HDMI), and/or other types of components for converting physical events or phenomena to and/or from signals that pertain to device 504.

Network interface 712 may include a transceiver (e.g., a transmitter and a receiver) for device 504 to communicate with other devices and/or systems. For example, via network interface 712, device 504 may communicate with mechanical device 524, or another device on a network to which device 504 is connected.

Communication path 714 may provide an interface through which components of device 504 can communicate with one another.

Figure 8:
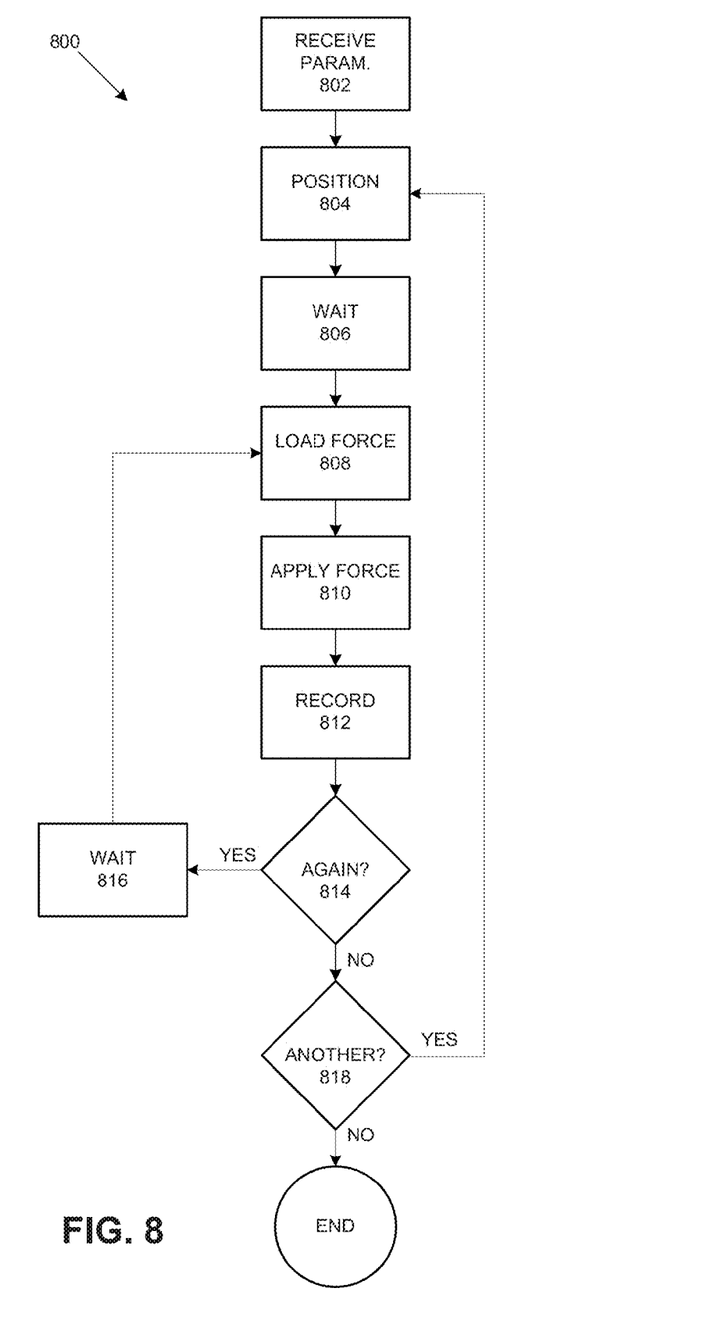
FIG. 8 illustrates an exemplary process associated with impact testing the fiber optic connector of FIGS. 2A and 2B.

FIG. 8 is a flow diagram of an exemplary process 800 that is associated with impact testing fiber optic connector 202. Process 800 may include controller/recording device 504 receiving, via a GUI, input parameters that are associated with the impact test (block 802). The parameters may include, for example, the mass of hammerhead 520, the length of arm 518, a spring constant of force translator 522 (e.g., when force translator 522 is implemented as a spring), desired level of impact amount of momentum/impulse, etc.

Process 800 includes positioning fiber optic connector 200 and optical fiber cable 202 in system 500 for an impact test trial (block 804). For example, controller/recording device 504 may move cable support component 508, rotator 510, and/or cable holder 512 as illustrated in FIG. 6, until fiber optic connector 202 hanging from cable holder 512 is in the position to be struck by hammerhead 520.

Controller/recording device 504 may wait for a period of time (block 806) (e.g., a length of time approximately needed for fiber optic cable 200 to stop swinging and to become stationary). In some implementations, controller/recording device 504 may cause a mechanical component (not shown) to guide fiber optic connector 200 or optical fiber cable 200 to a stationary position.

Controller/recording device 504 may load a force, via mechanical device 524, to be applied to hammerhead (block 808). For example, controller/recording device 504 may cause (e.g., send control signals) mechanical device 504 to pull hammerhead 520 back. In some implementations, controller/recording device 504 may also adjust the tension in force translator 522. When the loaded force is applied (e.g., unloaded) to hammerhead 520, hammerhead 520 may strike fiber optic connector 200 with the desired level momentum/velocity. In one implementation, controller/recording device 504 may have determined the force to be applied to hammerhead 520 based on parameters that are input at block 802 and based on numerically obtained solutions to expressions (1) or (2).

Controller/recording device 504 may cause the force to be applied to hammerhead 520 (block 810). For example, depending on the implementation, controller recording device 504 may cause mechanical device 524 to release hammerhead 520 from the pulled-back position or hit hammerhead device 520. Consequently, hammerhead 520 may strike fiber optic connector 200 with the desired level of momentum/impulse.

In some implementations, controller/recording device 504 may obtain a signal indicative of the angular velocity of arm 518 from a sensor, and use the signal as a feedback signal in controlling mechanical device 524 to further accelerate or decelerate hammerhead 520, until the moment of impact. In such a case, controller/recording device 504 may operate as a servo controller.

Controller/recording device 504 may record different parameters that are associated with an impact test trial and with the force applied to hammerhead 520 at block 810 (block 812). For example, controller/recording device 504 may record the time of the trial/test run, the velocities of hammerhead 520 just before and after hammerhead 520 strikes fiber optic connector 200 (e.g., in implementations that use a sensor to measure the velocity of arm 518), the trial number, etc.

Controller/recording device 504 may determine whether fiber optic connector 200 is to be struck again (block 814). Depending on the impact test, controller/recording device 504 may be programmed to cause hammerhead 520 to strike fiber optic connector 200 ma number of times. If fiber optic connector 200 is to be struck again (block 814: yes), process 800 may proceed to block 816. At block 816, controller/recording device 504 may wait until fiber optic connector 200 is relatively stationary (block 816) and return to block 808.

If fiber optic connector 200 is not to be struck again (block 814: no), controller/recording device 504 may determine whether another fiber optic connector 200 needs to be tested (block 818). If there are no more fiber optic connectors 200 to be tested (block 818: no), process 800 may end. Otherwise (block 818: yes), process may return to block 804.

In the implementations described above, system 500 may impact test fiber optic connector 200 for resistance against damages. System 500 may impart an impact to fiber optic connector 200 via hammerhead 520 attached to DIM 518. When mechanical device 524 pulls and releases hammerhead 520, hammerhead 520 may hit fiber optic connector 200. Controller/recording device 504 may record test parameters, such as the impulse that hammerhead 520 has imparted to fiber optic connector 200.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in some implementations, fiber optic connector 200 may be impact tested without being connected to optical fiber cable 202. In such implementations, system 500 may not include cable support component 508, rotator 510, and cable holder 512. Furthermore, system 500 may include a device (e.g., a net) for catching fiber optic connector 200 when fiber optic connector 200 bounces off from hammerhead 520.

In another example, in some implementations, system 500 may impact test devices/components other than fiber optic connector 200. For example, system 500 may impact test an electronic device, such as an electronic notepad, smart phone (e.g., iPhone™), tablet computer, laptop computer, etc.). In such implementations, system 500 may include a device or clamp to hold and/or adjust the orientation of the tested component/device. System 500 may impact test a smart phone with a touch screen, for example, to determine likely results of dropping the smart phone on a hard surface.

White a series of blocks have been described with regard to the process illustrated in FIG. 8, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a first member from which an optical fiber cable and an fiber optic connector attached to the optical fiber cable hang, wherein the optical fiber cable is rotatingly attached to the first member via a cable holder;
   a second member to which an upper end of an arm of a hammer is rotatingly coupled;
   a spring connected to a point on the arm and a fixed structure on a frame supporting the first member and the second member;
   a mechanical device for applying a force against the spring by pulling the arm or the hammer; and
   a cooling device that houses the first member, the optical fiber cable, the fiber optic connector, the second member, and the spring,
   wherein the cooling device cools the fiber optic connector to a desired temperature, and
   wherein when the mechanical device stops applying the force, the spring and gravity cause the hammer to move toward the fiber optic connector and strike the fiber optic connector.

2. The device of claim 1, further comprising:
   a controller configured to determine an amount of the force and cause the mechanical device to apply the amount of force.

3. The device of claim 2, wherein, when the controller determines the amount of force, the controller is further configured to:
   determine the amount of force based on an impact of the strike, wherein the impact is approximately equal to an impact on the fiber optic connector if the fiber optic connector were to fall from a given height and hit a ground.

4. The device of claim 2, wherein the controller includes a servo controller to cause the mechanical device to apply the amount of force.

5. The device of claim 1, wherein the hammer includes a hammerhead having a surface that emulates a surface of a ground.

6. A system comprising:
   a first assembly including a first device;
   a second assembly to which one end of a rigid arm is rotatingly affixed, wherein another end of the arm is affixed rigidly to a mass;
   a mechanical device for applying a force to the mass; and
   a controller for causing the mechanical device to apply the force to the mass, wherein after the mechanical device applies the force to the mass, the mass swings from and about the second assembly and strikes the first device, and wherein the controller is configured to:
determine an amount of the force required for the mass to strike the first device with an impact approximately equivalent to an impact that would result from the first device hitting the ground after falling from a specified height; and cause the mechanical device to apply the determined amount of the force to the mass.

7. The system of claim 6, further comprising:
a spring whose one end is attached to a point on either the arm or the mass, and whose other end is attached to a stationary member,
wherein when the mechanical device applies the force to the mass, the ends of the spring press against the arm and the stationary member,
wherein when the mechanical device stops applying the force, the spring pushes the arm and moves the mass toward the first device.

8. The system of claim 6, further comprising a cable catcher,
wherein the first assembly includes a cable hanger to which one end of an optical fiber cable is attached and another end of the optical fiber cable is connected to the first device,
wherein after the mass strikes the first device and the first device and the optical fiber cable swing away from a point of impact, the cable catcher catches the optical fiber cable and prevents the first device from hitting the mass.

9. The system of claim 6, further comprising:
a cooling device that houses the first assembly, the second assembly, the mechanical device, the mass, the arm, and the first device,
wherein the cooling device cools the first device by lowering an ambient temperature inside the cooling device.

10. The system of claim 9, wherein the ambient temperature ranges from −20 degrees centigrade to −40 degrees centigrade.

11. The system of claim 6, wherein the first device includes a smart phone, tablet computer, or a laptop computer.

12. The system of claim 6, wherein the system further comprises additional devices in the first assembly,
wherein the controller automatically directs the mechanical device to apply a force to the mass for impact testing each of the additional devices.

13. The system of claim 6, wherein the controller is further configured to determine the amount of the force based on numerical solutions of an equation of motion of a pendulum with a spring.

14. The system of claim 6, wherein the controller is further configured to determine the amount of the force based on a signal from a sensor attached to the second assembly, wherein the sensor measures angular velocity of the arm, and generates the signal in accordance with the measured angular velocity.

15. A method comprising:
positioning a fiber optic connector to be struck by a head of a pendulum, the fiber optic connector hanging via an optical fiber cable attached to an assembly;
loading a force on a spring that is attached to an arm of the pendulum;
measuring a first temperature of the fiber optic connector before the head of the pendulum strikes the fiber optic connector;
allowing the force on the spring to push the arm of the pendulum, causing the head of the pendulum to strike the fiber optic connector;
measuring a second temperature of the fiber optic connector after the head of the pendulum strikes the fiber optic connector; and
determining amount of energy absorbed by the fiber optic connector partly based on the first temperature and the second temperature.

16. The method of claim 15, further comprising:
determining an amount of the force necessary to deliver a given impact, by the head of the pendulum upon striking the optical fiber connector when the force on the spring is allowed to push the arm of the pendulum and cause the head of the pendulum to strike the fiber optic connector.

17. The method of claim 16, wherein the given impact is equivalent in magnitude to an impact, on the fiber optic connector, that would result from the fiber optic connector falling from a specified height and hitting a ground.

18. The method of claim 16, wherein the desired temperature ranges from −20 degrees centigrade to −40 degrees centigrade.

19. The method of claim 15, further comprising:
cooling the fiber optic connector to a desired temperature.

20. The method of claim 15, wherein the head of the pendulum includes a surface similar to a surface of a ground.

* * * * *